April 9, 1940.                D. C. BAILEY                2,196,888
                              WEATHER STRIP
                            Filed Jan. 18, 1939

Inventor.
David C. Bailey.

Patented Apr. 9, 1940

2,196,888

UNITED STATES PATENT OFFICE 2,196,888

WEATHER STRIP

David C. Bailey, Amesbury, Mass.

Application January 18, 1939, Serial No. 251,543

4 Claims. (Cl. 20—69)

This invention relates to certain improvements in weather strips, which are primarily designed for use in automobile bodies where an ornamental finish is not required, and has for its objects to provide a weather strip which may be manufactured at comparatively small expense, which is readily bendable in any direction and is adapted to be readily applied to a projecting flange, or edge portion, and when applied to be securely held in position and effectively seal a joint between two parts, or to provide a cushion for a window glass, when required.

I accomplish these objects by providing a weather strip having a core which, in some respects, is similar to the core disclosed in my prior Patent No. 2,102,936 of December 21, 1937, in that it is formed of thin corrugated sheet metal, said core being bent transversely into a form which permits ready application to a projecting flange or edge portion and which is covered by a fabric having a tufted portion incorporated therein and located on the face side of the strip in position for engagement with the body portion or window glass between which and the part to which the strip is attached there is a joint which is to be sealed.

For a more complete disclosure of my present invention reference is now made to the following specification in connection with the accompanying drawing in which.

Weather strips are employed in various relations in automobile bodies for the purpose of obstructing drafts or preventing the entrance of water, and also to cushion window glass and provide a tight joint between the glass and a body part.

Figure 2:
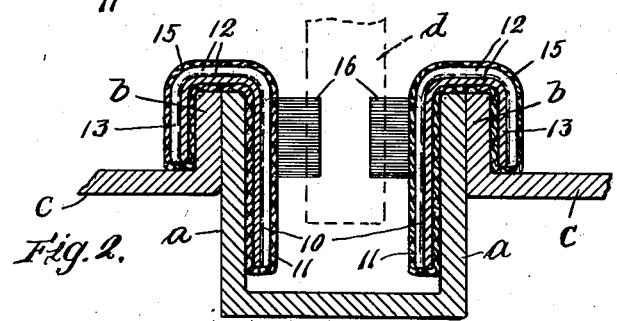
Fig. 2 is a sectional view illustrating an application thereof to an automobile part.

One application thereof is illustrated in Fig. 2, in which the sides $a$ of a channel shaped body portion are spot welded to flanges $b$ of door panels $c$, forming flanges between which the edge portion of a window glass $d$ is located and is to be cushioned.

According to my invention I provide a core which consists of a strip of thin sheet metal, having closely associated corrugations $ll$ which extend transversely thereof from edge to edge in parallel relation, the metal of which the core is formed being bendable and slightly resilient.

The core is bent transversely to form a middle portion $l2$ of approximately the same width internally as the thickness of the flange $a$, $b$, an outer side portion $l3$ which is of no greater width than the height of said flange and an inner side portion $l0$ which is of somewhat greater width than the outer side portion $l3$.

Figure 1:
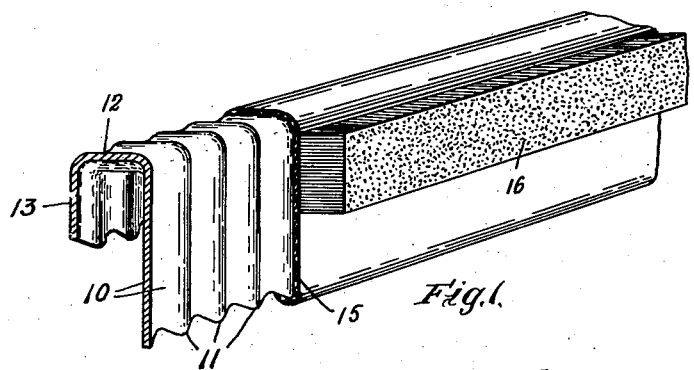
Fig. 1 is a combined sectional and perspective view of a weather strip embodying my invention.

The entire inner and outer surface of the core is covered by a strip of textile fabric $l5$, which is adhesively connected thereto throughout its entire surface. The fabric is provided with a longitudinally extending cushioning rib $l6$ on the middle of the wider side portion of the core, said rib being composed of vertical pile which are secured to the fabric in upright position, as indicated in Figs. 1 and 2.

The core is so constructed that, with the lining on its inner sides, it will fit tightly on the flange $a$, $b$, so that considerable force is required to force it onto the flange $a$, $b$ until its middle portion engages the top of the flange. The weather strip will thus be attached to the flange by frictional engagement. A weather strip will be applied to both flanges, as shown in Fig. 2. The fact that the core is corrugated greatly increases its strength and holding power. The fabric covering is securely clamped between the sides of the core and the flange on which the strip is mounted, so that it will not become detached from the core even if the adhesive connection is imperfect. The strip is adapted to be bent either in the plane of its sides or laterally thereof, so that it may be readily conformed to any requirement.

In use the tufted portion $l6$ engages the glass or other part, as shown in Fig. 2 and provides a suitable cushion therefor and at the same time tightly closes the joint between the two adjacently disposed parts.

Figure 3:
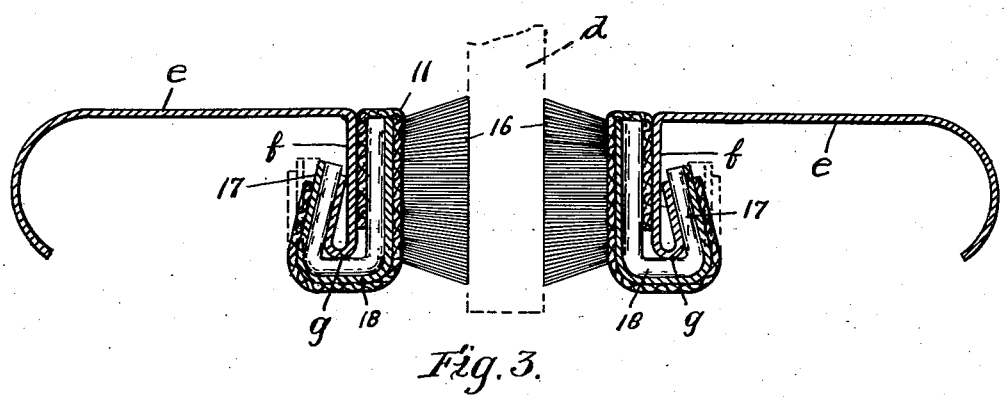
Fig. 3 is a sectional view similar to Fig. 2 illustrating a modified form of connection of the strip with a garnish molding, or other body member.

In Fig. 3, a method of connecting the weather strip to a garnish molding is illustrated, in which the moldings $e$, have flanges $f$, the edge portions of which are hemmed or bent reversely to form thickened edge portions $g$.

For use in this connection the weather strip $l8$ is constructed as already described, the core being constructed to fit tightly onto the flange of the molding. The outer portion of the core, however, extends somewhat beyond the thickened portion of the flange, when in this position, and its edge portion $l7$ is bent inward, after the strip has been forced into position on the flange, so that the strip is securely locked to the flange, as shown in Fig. 3.

With either of the above described constructions the use of staples or other small fasteners to secure the weather strip in position is avoided, such prior means being objectionable, as they are likely to cause leakage, but with the above described constructions all danger of leakage from such sources is obviated.

I claim:

1. A weather strip having a core consisting of a strip of thin sheet metal having closely arranged transverse corrugations extending from edge to edge thereof, said core being bent to form a longitudinal intermediate portion and two side portions disposed approximately perpendicular thereto, and a fabric covering connected to the outer and inner surfaces of said core and having a cushioning rib thereon extending longitudinally of the outer side of one of said side portions.

2. A weather strip having a core consisting of a strip of thin sheet metal having closely arranged transverse corrugations extending from edge to edge thereof, said core being bent to form a longitudinal intermediate portion and two side portions of unequal width disposed approximately perpendicular thereto, and a fabric covering connected to the outer and inner surfaces of said core and having a cushioning rib thereon extending longitudinally of the outer side of the wider of said side portions.

3. A weather strip having a core consisting of a strip of thin sheet metal having closely arranged transverse corrugations extending from edge to edge thereof, said core being bent to form a longitudinal intermediate portion and two side portions approximately perpendicular thereto, and a fabric covering extending from the inner side of each side portion of the core and about the edges and outer sides thereof and adhesively connected thereto, and said fabric having a cushioning rib extending longitudinally on the outer side of one of said side portions.

4. In combination with a body molding having a flange provided with a thickened edge portion, a weather strip of thin sheet metal having closely arranged transverse corrugations extending from edge to edge thereof, said core being bent in U-form and adapted to fit onto said flange, a fabric covering on the surface of said core, said covering having a longitudinal cushioning rib on one of the side portions of the core and the opposite side portion of the core being bent inward beyond the thickened edge portion of the flange to lock the strip thereto.

DAVID C. BAILEY.